Feb. 19, 1929.

O. HENKER 1,702,258

DEVICE FOR DETERMINING THE SQUINT DEFLECTION

Filed Jan. 29, 1925

Inventor:
Otto Henker

Patented Feb. 19, 1929.

1,702,258

UNITED STATES PATENT OFFICE.

OTTO HENKER, OF JENA, GERMANY, ASSIGNOR TO THE FIRM CARL ZEISS, OF JENA, GERMANY.

DEVICE FOR DETERMINING THE SQUINT DEFLECTION.

Application filed January 29, 1925, Serial No. 5,618, and in Germany February 2, 1924.

The subject of the present invention is a device for determining the squint deflection. Such devices are formed by a scale disposed in the focal plane of a collective lens by which the scale is to be observed with both eyes. The present invention consists in that between the aforesaid collective lens and each of the loci of the eye there is disposed a cylindrical lens. Owing to this arrangement it is possible for the point of the scale, lying on the optical axis of the collective lens, to eliminate the astigmatism of oblique pencils which, on account of the large aperture of the collective lens common to both eyes, is not to be neglected for this point. Thereby the cylindrical lenses may either be also constructed as collective lenses and arranged in such a way that their cylindrical axes run within the plane, which is determined by the collimator axis and the two loci of the eye, or the cylindrical lenses may be constructed as dispersive lenses. In the latter case the cylindrical axes should be perpendicular to the said plane. The construction of the cylindrical lenses as dispersive lenses is to be preferred owing to the decrease of the spherical aberrations attainable in this case.

Figure 1:
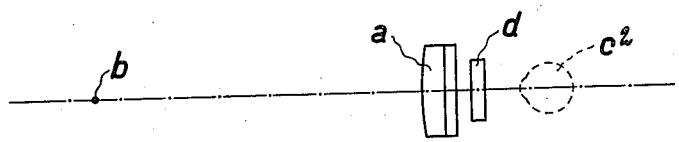
Figure 2:
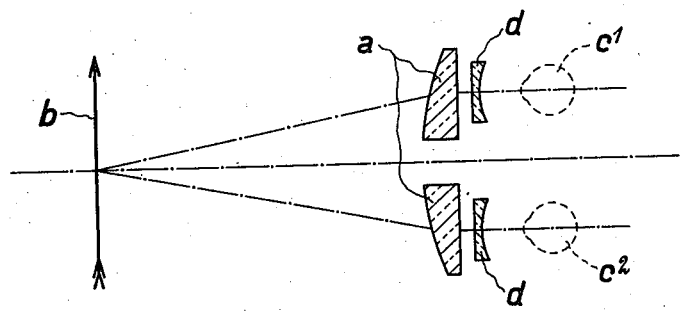

The annexed drawing shows as a constructional example the optical system of a device according to the invention, viz, Fig. 1 is an elevation and Fig. 2 is a horizontal section. The device consists of a collective lens $a$ in whose front focal plane is disposed a scale $b$ which is to be observed by a pair of eyes $c^1$, $c^2$. From the collective lens $a$ the optically ineffective parts are removed, so that the lens consists of two separate parts. Between each of these parts and one locus of the eye is disposed a dispersive cylindrical lens $d$, whose cylindrical axis is vertical.

I claim:

1. A device for determining the squint deflection, containing a collective lens, two cylindrical lenses, disposed side by side behind the said collective lens at a distance apart which is approximately equal to the human interpupillary distance and a scale, being of a length about equal to the diameter of the said collective lens and disposed on the opposite side of the said collective lens in its focal plane.

2. A device for determining the squint deflection, containing a collective lens, two concave cylindrical lenses, disposed side by side behind the said collective lens at a distance apart which is approximately equal to the human interpupillary distance, the cylindrical axes being perpendicular to the plane which is determined by the centres of the said cylindrical lenses and the axis of the said collective lens, and a scale, being of a length about equal to the diameter of the said collective lens and disposed on the opposite side of the said collective lens in its focal plane.

OTTO HENKER.